United States Patent Office 3,491,039
Patented Jan. 20, 1970

3,491,039
STRIPPABLE PAINT COMPOSITION COMPRISING EMULSION COPOLYMER PRODUCT OF ESTER MONOMER AND VINYL MONOMER IN THE PRESENCE OF A WATER SOLUBLE RESIN TRUNK POLYMER
Masao Takahashi and Tadanori Fukuda, Ohtsu-shi, Japan, assignors to Toyo Rayon Kabushiki Kaisha, Tokyo, Japan, a corporation of Japan
No Drawing. Filed May 10, 1967, Ser. No. 637,331
Claims priority, application Japan, May 8, 1967, 42/28,854
Int. Cl. C09d 5/20, 3/80
U.S. Cl. 260—17                                    7 Claims

ABSTRACT OF THE DISCLOSURE

A strippable paint composition capable of forming a strippable paint comprising an emulsion obtained by co-polymerizing a $C_1$–$C_8$ alkyl ester of acrylic acid and a vinyl monomer selected from the group consisting of vinyl chloride, styrene, methyl methacrylate, acrylonitrile, vinylidene chloride, $\alpha$-methyl styrene, vinyl acetate, vinyl ester propionate and methacrylonitrile, in the presence of a water soluble resin trunk polymer having a molecular weight of at least 10,000 selected from the group consisting of polyvinyl methyl ether, methyl cellulose, polyacrylamide, hydroxyethyl cellulose, polyethylene oxide, polyvinyl alcohol, partially saponified derivative of polyvinyl alcohol, polyvinyl pyrrolidone and carboxy methyl cellulose.

The water soluble resin trunk polymer is present in an amount of 0.5–50% by weight, preferably 1–10% by weight based on the weight of the ester and vinyl monomers. Such paint can be stripped as a continuous film from a solid surface to which the same is applied.

---

This invention relates to a strippable paint composition capable of forming a strippable film having improved physical properties.

More particularly, this invention relates to a strippable paint composition which is am emulsion obtained by co-polymerizing (b) an ester monomer selected from the group consisting of an alkyl ester of acrylic acid in an amount of 40–90% by weight based on the total monomer containing a monomer of (c), and (c) a monomer of the vinyl series other than (b), above, copolymerizable with the monomer of (b) in the presence of (a) a water-soluble resin trunk polymer in an amount of 0.5–50% by weight based on the total of the monomers of said (b) and (c) in a medium of a saturated aliphatic lower alcohol having 1–4 carbon atoms which may contain up to 60% by weight of water, characterized in that cohesion energy density of a film formed on the surface of a matter with said emulsion is not less than 80 cal./cm.$^3$, glass transition point of said film is from $-40°$ C. to $+30°$ C. and said film is strippable in a state of a continuous film from the surface of said matter.

A so-called strippable paint applied to the surface of a matter to form a film on said surface and upon using of said matter said film is stripped to expose the inherent surface of the matter, is known.

In contrast to an ordinary paint required of having adhesion sufficient to prevent a film formed on the surface of matter by said paint from easily peeling off and so composed as to have such adhesion, a strippable paint, the object of this invention is essentially distinguishable from such ordinary paint in that it is required of having such adhesion that a film formed on a matter by said paint is easily and completely strippable from the surface of the matter at any desired time, but difficult to strip off of itself, and so composed as having such adhesion.

Accordingly, knowledge concerning an ordinary paint for coating is not useful for a strippable paint.

Further, a film formed by a strippable paint has a complete self-supporting property and is capable of forming a continuous film having satisfactory physical properties until it is stripped off to expose the inherent surface of a matter including during stripping operations and is distinguishable from an adhesive composition in that it should not have such tackiness as that of a so-called adhesive, accordingly, knowledge concerning an adhesive is not useful at all for a strippable paint.

Because a strippable paint has advantages such that it is not limited by shape and size of a matter to be applied therewith, its application is very simple and there is no necessity to subject a matter from which it is stripped to cleansing operations, it attracts attentions for use for protection of the surface upon maintenance, transportation and display of a matter.

Heretofore, as a strippable paint of this kind, polyvinyl chloride, vinyl chloride-vinyl acetate copolymer, polyvinyl-butyral, cellulose derivative, a low molecular weight polyethylene or what mixes a proper amount of paraffin chloride have been utilized as resin component, these resin components have been dissolved in a good solvent such as ketones, chlorinated hydrocarbon and an aromatic hydrocarbon, and a considerably large amount of a plasticizer has been added to produce a paint. And when a strippable paint containing that kind of resin component and a good solvent for said component is applied to the surface of a matter, because a hot dip method requiring heating for a long period has been employed and besides a plasticizer, addition of a heat stabilizer and an antioxidant has been required.

From these reasons, many limitations have been placed on the material of the matter to be applied therewith per se and there have been enough rooms for improvement in the application operation. Especially, when such strippable paint has been applied to the surface of a matter already coated with an ordinary paint, a fatal defect that coexistence of solvent, plasticizer, dispersing agent, fats, stabilizer and other additives which might cause swelling and stain of the coated ordinary paint has been unable to be avoided and overcome, it has not been usable.

Also selection of a resin component has been very difficult, and when its selection was wrong, upon stripping it from the surface of a matter, a film formed by strippable paint could not be stripped in the form of a continuous film, but was broken, or to prevent this when tenacity of the film was tried to be raised, an inclination to strip of itself has become large and at a time when it should cover the surface of the matter it stripped of itself. Further, when adhesion was tried to be improved to prevent this, one encountered a situation hard to be controlled, often adhesion was brought about and it has become what is entirely improper as a strippable paint.

Moreover, as to criterion of imparting necessary and sufficient film tenacity, imparting necessary and sufficient adhesive strength and preventing viscous strength from occurring, it has been entirely unknown and these elements seem to have complicated correlationship which cannot be made clear phenomenally.

Further, coupled with the fact knowledge concerning an ordinary paint and an adhesive is not useful at all, to anticipate how to provide an excellent strippable paint is entirely impossible and it was a technical task strongly wished in the field of the art to provide a strippable paint composition having proper elasticity, tenacity, softness, property not hurting an ordinary paint film, weatherability (resistance to temperature, humidity, rain and direct sunshine), soline resistance (aptitude for maritime transportation), acid resistance and alkali resistance, forming an excellent protective film until one desires to strip it off and upon stripping it is easily and completely strippable in the form of a continuous film, having no possibility of leaving a partial residue behind the matter and easily applicable by easy means such as spraying and brushing without being restricted by shape and size of the matter to be applied therewith.

As a result of conducting researches to solve this task, the present inventors have found that a strippable paint which is an emulsion obtained by copolymerizing a mixed monomer of an alkyl ester of acrylic acid in an amount of a specified ratio and a monomer of the vinyl series other than that in the presence of a water-soluble resin trunk polymer in an amount of a specified ratio in a medium within a special range of kind which may contain water below a specified amount, cohesion energy density of a film formed therefrom is at least 80 cal./cm.$^3$ and its glass transition point is from $-40°$ to $+30°$ C., can be produced at one stroke and that a film formed by the so obtained paint has solved the aforementioned task, becoming a remarkably improved strippable paint composition.

Accordingly, an object of this invention is to provide an excellent strippable paint having solved the aforementioned technical task.

Another object of this invention is to make clear a process for providing such composition.

Many other objects and advantages of this invention will become clearer from the following description.

Even when the resin component used in the composition of this invention is separately produced merely to satisfy the kind of reactants and their volume relation and a copolymer composition containing this graft copolymer is made an emulsion using a medium of a saturated aliphatic lower alcohol having 1–4 carbon atoms which may contain below 60% by weight of water, a stable emulsion is difficult to obtain, for instance, even when an emulsion is made forcibly by utilizing an emulsifier, a strippable paint solving said task cannot be obtained, especially weatherability deteriorates. Accordingly, it should be understood that in order to specify the composition of this invention, specific addition in the process for the preparation is necessary.

Next, explanations will be made about reactants of (a), (b) and (c) constituting the resin component required in this invention.

Of these reactants, a water-soluble resin trunk polymer of the requirement (a) acts concurrently as a suspension in the reaction and as a trunk polymer of a graft copolymer.

Details of roles of the trunk polymer in the copolymerization system of this invention is unknown; however, its influence is seen in storage stability of the obtained strippable paint and alkali and acid resistance of a film formed by said paint, and an improved strippable paint is obtained similarly, however, in the copolymerization reaction specified in this inventon when the water soluble resin shows both an action of a trunk polymer as good as possible and at the same time an action as a suspension is desirable. From this viewpoint, it is preferable that a water-soluble resin trunk polymer of the requirement (a) is a polymer having a molecular weight above 10,000 selected from the group consisting of polyvinyl alcohol, a partially saponified derivative thereof, polyvinyl pyrrolidone and carboxymethyl cellulose. As what is lower in action as a trunk polymer than said preferable trunk polymer, but similarly displays said two actions and usable water-soluble trunk polymer of the requirement (a), for instance, a polymer having a molecular weight of above 10,000 selected from the group consisting of polyvinylmethyl ether, methyl cellulose, polyacrylamide, hydroxyethyl cellulose, dextrin and polyethylene oxide may be cited.

As an alkyl ester of acrylic acid of the requirement (b), methyl-, ethyl-, propyl-, butyl-, 2-ethyl-1-hexyl-ester of acrylic acid may be cited. Especially, an aliphatic lower alkyl ester having 1–4 carbon atoms is recommended.

As a monomer of the vinyl series of the requirement (c), however, a considerably broad kind of monomer can be utilized, in order that a film formed by the obtained strippable paint has preferable physical properties, it is recommended that the monomer of the requirement (c) is a monomer selected from the group consisting of vinyl chloride, styrene, methyl methacrylate and acrylonitrile. As other usable monomers of the requirement (c), for instance, a monomer selected from the group consisting of vinylidene chloride, α-methyl styrene, vinyl acetate, vinyl ester propionate and methacrylonitrile may be cited.

In this invention, as a trunk polymer of the requirement (a), partially saponified polyvinyl alcohol, preferably having a degree of saponification of 85–89%, more preferably, 88–89% and a molecular weight of 40,000±5,000 gives an especially excellent result, and as a monomer of the requirement (c), acrylonitrile or methylmethacrylate is especially preferable.

In this invention, relative to selection of reactants of the requirements (a), (b) and (c) and selection of reaction medium of which mention will be made later, a ratio by volume of a trunk polymer to a monomer mixture, and a ratio by volume of a monomer of the requirement (b) occupied in the monomer mixture are also important.

Namely, a trunk polymer in an amount of 0.5–50% by weight, preferably 1–10% by weight based on the total monomer of the requirements (b) and (c) is used. When it is too small, including during the copolymerization reaction, stability of the produced emulsion is poor, it tending to be gelated during the reaction and bring about an inconvenient phase separation. Also when a trunk polymer in an amount exceeding 50% by weight is used, water resistance of a film lowers.

The amount of an ester monomer of the requirement (b) occupied in the total of monomers of the requirements (b) and (c) is 40–90% by weight, preferably 50–80% by weight. Relative to said volume of a trunk polymer of the requirement (a), when the composed ratio of this mixed monomer becomes smaller than 40% by weight, film-formability of a paint at room temperature lowers.

And when it exceeds 90% by weight, tenacity of a film lowers and adhesion increases and strippability lowers.

The copolymerzation reaction is carried out in a saturated aliphatic lower alcohol medium having 1–4 carbon atoms or said medium containing up to 60% by weight of water. These media contained in the produced emulsion exists as they are as media in the strippable paint of this invention.

Since in this invention, concentration of a resin component derived from said (a), (b) and (c) in an emulsion is preferably 20–60% by weight, it is advantageous to carry out the reaction in a medium in an amount so that the resin component in the emulsion may become said amount by taking into account a loss during the polymerization reaction. It goes without saying that in the obtained emulsion, it is possible to control the amount of a medium to a proper amount, however, it is undesirable to carry out the copolymerization using an excessively small or large amount of a medium requiring later addition or removal of an excessively large amount of the medium. Ordinarily, a medium in an amount of 20–60% by weight, preferably 25–45% by weight based on the reactants is used. In case a proper amount of a medium is added to the obtained emulsion it is preferable to add a mixture of water and alcohol or an alcohol whose surface tension is small.

An alcohol medium having at least 5 carbon atoms is not only improper for formation of a resin component using said specified reactants suitable for a strippable paint, but also affects adveresly when the obtained strippable paint is applied to the surface of a matter already coated with an ordinary paint, and in an extreme case, it cannot be used, therefore, it should be avoided.

As said alcohol medium having 1–4 carbon atoms utilized in this invention, for instance, methanol, ethanol, n-propanol, isopropanol, butanol, sec-butanol and tert-butanol may be cited. The polymerization may be carried out utilizing an emulsion polymerization of a water-soluble resin and a monomer of the acryl series known per se.

When to a system having copolymerized the monomers of said (b) and (c), a water-soluble resin of (a) is added, the object of this invention cannot be achieved. Especially water resistance of a film is poor and the quality is inferior. In the presence of a water-soluble resin of said (a), polymerization reaction of (b) and (c) is carried out. It is possible to add a water-soluble resin at an initial stage of the reaction and have the greater part of the reaction carried out in the presence of a water-soluble resin of (a), however, it is preferable to make a water-soluble resin of (a) exist from the outset of the reaction in the reaction system.

As a polymerization catalyst, a water-soluble catalyst known per se, for instance, ammonium persulfate and potassium persulfate is suitable. As to the amount to be used, the range of 0.01–1% by weight based on the total of monomers of said (b) and (c) is preferable.

The polymerization can be ordinarily carried out at a temperature within the range of 30–100° C. Since, however, as a monomer component an alkyl ester of acrylic acid is used, hydrolysis of the ester becomes a problem. When the strippable paint is applied to the surface of a metal product coated with lacquer, it is necessary to prevent hydrolysis of the ester and for that end a temperature below 65° C. is preferable. On the other hand, when the polymerization temperature is low, the molecular weight of the copolymer increases and a good result is obtained as a film, however, the polymerization rate is very slow and the degree of polymerization is difficult to rise, therefore, a temperature above 40° C. is desirable.

As to the polymerization period, ordinarily 6–8 hours are sufficient, however, there is no particular limit and depending upon the reaction temperature, kind of reactants and kind of the reaction medium, a shorter or a longer period may be adopted.

The obtained emulsion can be offered per se or after properly adjusting the concentration of the resin component for use as a strippable paint.

It is preferable that surface tension of this emulsion is below 45 dyne/cm. When it exceeds this limit, wet to the surface of a matter becomes poor and there is a possibility that application becomes difficult or applied unevenness is brought about.

Also operability of the strippable paint of this invention when applied is excellent when viscosity of said paint composition is within the range of 0.1–50 poise, preferably 10±5 poise. Accordingly, as occasion demands a thickener may be added to the obtained emulsion to adjust the viscosity.

As such surface active agent, for instance, a nonionic surface active agent such as polyethylene glycol is suitable and it may be used in an amount of 5% by weight based on the resin component. However, in this invention it need not be added particularly. And as a viscosity increasing agent, then are, for instance, water-soluble polymers such as polyvinyl alcohol and polyvinyl pyrrolidone and each of them may be used in an amount of 5% by weight based on the resin component.

Further, if so desired, it is possible to add a coloring agent such as pigment and dyestuff to make a film formed on the surface of a matter a colored film.

Said emulsion used for the strippable paint of this invention obtained by the reaction (not added with additives) is an emulsion, a film formed thereby has a cohesion energy density of above 80 cal./cm.$^3$ ordinarily up to 170 cal./cm.$^3$ and a glass transition point of from −40° C. to +30° C.

When the cohesion energy density is below 80 cal./cm.$^3$, tenacity of film is insufficient and upon stripping it is possibly broken and remains on the surface of a matter, and when it exceeds 170 cal./cm.$^3$, the film tends to strip of itself regardless of the time when stripping is desired, it being unsuitable.

When said cohesion energy density, the glass transition point must satisfy said range simultaneously. When the glass transition point is too low, tenacity of a film will be insufficient and tackiness will be brought about, and when it is too high exceeding 30° C., operability at a time of application of a strippable paint to the surface of a matter, film forming property and storage stability of said paint will be deteriorated.

At any rate, in a strippable paint, restriction derived from its usage limits the tenacity of a film to be formed and adhesion of a matter to the film. Namely, it is necessary that a strippable paint should have an adhesion whereby it is not simply stripped off when it covers the surface of a matter and physical properties of a film sufficient for achieving the object of protecting the surface of the matter, and an adhesion whereby it can be easily stripped off when one desires to expose the inherent surface of the matter and a film is not broken during stripping and does not adhere and leave a part on the surface of the matter.

When the aforementioned requirements of the preparation such as selection of reactants, their volume ratios and the reaction conditions are met and said cohesion energy density and glass transition paint are met, the object of this invention will be achieved.

Ordinarily, a film has a tensile strength of above 50 kg./cm.$^2$ and a peel strength of below 50 g./cm.$^2$ and average molecular weight of the resin component in the emulsion is at least 30,000. The resin component whose average molecular weight is below 30,000 does not enable the paint to be stripped in the form of a continuous film.

When concrete examples of uses of the strippable coating compositions are shown, they become as follows:

Packing material for metal products.

Coating of tools and machines for prevention of damages during transportation.

Coating of plastics for prevention of damages on the surfaces.

Coating of a spray booth for prevention of stain.

Coating of stone material for prevention of damages during operation.

Coating of an automobile for prevention of damage and stain at the time of making outer and inner equipments and assembly.

Coating of an automobile for prevention of damage and stain due to soot and dust, etc.

Coating of building materials such as sash and spandrel for prevention of damages at the time of mounting and during transportation.

Coating of decorative plates and products finished by grinding (metal coating and stone material) for protection of the surface.

Coating of domestic electric appliances as well as other machine parts for prevention of stains of coated surfaces at the time of assembly, fitting, maintenance, storage and during transportation.

A film obtained according to this invention is remarkably excellent in mechanical properties as well as chemical resistance, being preferable as a strippable film, it is also excellent in weatherability and durable for long period outdoor use. This composition may be applied by brush, spraying, roller, immersion and other known applying means.

Next, the effect of this application will be explained with reference to examples.

The measurements and indications of the properties in the following examples are as follows.

Viscosity (poise): JIS K-6381
Surface tension (dyne/cm.): Measured at 20° C. by Du Noüy's tensiometer
Stability: ASTM D1849-63
Glass transition point (Tg. ° C): ASTM D1043-51
Cohesive energy density ($\delta^2$ cal./cc.): Calculated by the following equation:

$$\delta^2 = \frac{d\Sigma G}{M}$$

d: density of polymer,
m: molecular weight of a polymer constituting unit;
ΣG: molecular attraction constant See P. S. Small; J. Appln. Chem. 3, 71-80, 1948 and Chin Yun Huang, "Chemistry of Adhesion and Its Application" (Kobunshi Kagaku Publication Association, Japan), page 21.

Tackiness and Spontaneous pelling-off: Test of tackiness and spontaneous peeling-off were conducted by placing a stationary load of 70 g./cm.² on a film obtained from the paint at 20° C. for 24 hours, and then lifting the load.

Tackiness present: The film did not drop when the load was lifted, and could not be peeled off as a continuous sheet.

Tackiness absent: The film did not drop, but could be easily peeled off as a continuous sheet.

Spontaneous peeling-off present: The film dropped, when the load was lifted.

Peel strength (g./cm.): ASTM D1000-48T. Surface to be painted . . . An amino alkyd resin paint (Amilack, manufactured by Kansai Paint Company is applied to a soft steel plate by a sprayer, and then backing is effected for 30 minutes at 135° C. The so treated coated plate is used as a ground plate).

Strippability: A synthetic examination of tackiness, spontaneous peeling-off and peel strength. The degree of soiling on the surface was also considered.
  ◎: No tackiness and spontaneous peeling-off, and having a peel strength of 10 g./cm. or less with no staining of the surface (very excellent).
  ○: No tackiness and spontaneous peeling-off and having a peel strength of 10 to 50 g./cm. with no staining of the surface (excellent).
  X: Not satisfying any one of the above properties. A film cannot be peeled off as one continuous sheet (inferior).

Tensile strength (kg./cm.²): JIS Z-1523
Elongation (percent): JIS Z-1523
Weatherability: After leaving a test sheet for 6 months starting from April at a place where exposure to sunlight, wind, rain, etc. is unavoidable facing the south at an angle of 45° to the ground surface, the strippability, colour tone and deterioration of the film were determined.
  ◎: Change is only negligible (very excellent).
  ○: Deterioration in strippability and the tenacity of a film is 10% or less, and there is almost no change in colour tone (excellent).
  Δ: Deterioration is strippability and the tenacity of a film is 10 to 30%, and there is some change in colour tone (inferior).

Note.—A film having a degree of deterioration in strippability and tenacity of 30% or less cannot withstand use as a strippable paint.

Note.—If a film has an unsatisfactory strippability and the decrease in tenacity of 30% or more it cannot be used as a strippable paint.

Water-proofness: The state of a film when it was immersed in water for 5 hours at room temperature was determined by the naked eye.
  ◎: No change at all (very excellent).
  ○: Occurrence of a negligible swelling in a film (excellent).
  X: A film was markedly swollen and partially dissolved in water (inferior).

Transparency: A test piece was prepared by applying a paint in a thickness of 0.1 mm. onto an ordinary sheet glass (1.9 mm. thick) of JIS R-3201 standard. The test was conducted on the basis of the conditions of visual power examination using an international-type Japanese Visual Power Examination Table.
  ◎: An object was well seen through the test piece (excellent).
  ○: A contour of the object was seen through the test piece.

Note.—A film through which the contour of the object was seen ambiguously is designated as being non-transparent.

EXAMPLE 1

With the use of a reaction apparatus provided with a thermometer, a stirrer and a reflux condenser, 65% by weight of butyl acrylate and 35% by weight of acrylonitrile, and polyvinyl alcohol having a degree of saponification (D.S.) of 99% and a molecular weight (M.W.) of 30,000 in an amount based on the said monomers as indicated in Table 1–a were polymerized for 7 hours at 70° C. by an aid of 0.4%, based on the weight of the said monomers, of potassium persulfate as a polymerization initiator in a medium composed of 50% by volume of methyl alcohol and 50% by weight of water.

The properties of the resulting emulsion and those of the film obtained from it are shown in Table 1–b and 1–c.

TABLE 1-a.—POLYMERIZATION CONDITIONS

| | Water soluble resin (a) Polyvinyl alcohol D.S. 99%, M.W. 30,000 | Monomer (b) Butyl acrylate | Monomer (c) Acrylonitrile | Reaction medium (alcohol, vol. percent) methyl alcohol | Reaction temperature |
|---|---|---|---|---|---|
| A | 0.03 | 65 | 35 | 50 | 70 |
| B | 4 | 65 | 35 | 50 | 70 |
| C | 10 | 65 | 35 | 50 | 70 |
| D | 30 | 65 | 35 | 50 | 70 |
| E | 70 | 65 | 35 | 50 | 70 |

TABLE 1-b.—PROPERTIES OF EMULSION

| | Resin content, wt. percent | Average molecular weight of resin | Viscosity, poise | Surface tension, dyne/cm. | Stability | Average particle size of resin | Film forming property | Remarks |
|---|---|---|---|---|---|---|---|---|
| A | 50 | | | | | | | Gelation occurred during polymerization. |
| B | 50 | 250,000 | 25 | 30 | Absent | | Present | |
| C | 50 | 250,000 | 34 | 30 | do | | do | |
| D | 50 | 250,000 | 48 | 30 | do | | do | |
| E | 50 | 250,000 | 80 | 30 | do | | do | Coating unevenness appears. |

TABLE 1-c.—PROPERTIES OF FILM

| | Glass transition point, °C. | Cohesive energy density $\delta^2$, cal./cc. | Tackiness | Spontaneous peeling-off | Peel strength, g./cm. | Strippability | Tensile strength, kg./cm.$^2$ | Elongation, percent | Weatherability | Waterproof ness | Transparency |
|---|---|---|---|---|---|---|---|---|---|---|---|
| B | −5 | 100 | None | None | 7 | ◎ | 130 | 110 | ◎ | ◎ | ◎ |
| C | −2 | 100 | do | do | 8 | ◎ | 110 | 120 | ◎ | ◎ | ◎ |
| D | 5 | 100 | do | do | 7 | ◎ | 105 | 140 | ◎ | ○ | ◎ |
| E | 7 | 100 | do | do | 7 | ◎ | 90 | 150 | ○ | X | ◎ |

EXAMPLE 2

Procedures of Example 1 were followed under the same conditions as in Example 1 except that the ratio of the monomers (b) and (c) was varied as shown in Table 2-a. The properties of the resulting emulsion and those of the film obtained from it are shown in Table 2-b and 2-c.

TABLE 2-a.—POLYMERIZATION CONDITIONS

| | Water soluble resin (a) Polyvinyl alcohol D.S. 99%, M.W. 30,000 | Monomer (b) Butyl acrylate | Monomer (c) Acrylonitrile | Reaction medium (alcohol, vol. percent) methyl alcohol | Reaction temperature |
|---|---|---|---|---|---|
| F | 4 | 20 | 80 | 50 | 70 |
| G | 4 | 50 | 50 | 50 | 70 |
| H | 4 | 65 | 35 | 50 | 70 |
| I | 4 | 95 | 5 | 50 | 70 |

EXAMPLES 3–21

The same polymerization as in Example 1 was carried out using as (a) water-soluble resin either polyvinyl alcohol (PVA), polyvinyl pyrrolidone (PVP), or carboxymethyl cellulose (CMC); as (b) alkyl acrylate either methyl acrylate (MA), ethyl acrylate (EA), propyl acrylate (PA) or butyl acrylate (BA); and as (c) vinyl monomer either vinyl chloride (VC), styrene (ST), methyl methacrylate (MMA) or acrylonitrile (AN). In the below given Table 3, the water soluble polymers and various monomers are shown by the abbreviations indicated in the parentheses above.

TABLE 2-b.—PROPERTIES OF EMULSION

| | Resin content, wt. percent | Average molecular weight of resin | Viscosity, poise | Surface tension, dyne/cm. | Stability | Average particle size of resin | Film forming property | Remarks |
|---|---|---|---|---|---|---|---|---|
| F | 50 | 290,000 | 21 | 30 | Absent | | Absent | |
| G | 50 | 260,000 | 22 | 30 | do | | Present | |
| H | 50 | 250,000 | 25 | 30 | do | | do | |
| I | 50 | 250,000 | 20 | 30 | do | | do | |

TABLE 2-c.—PROPERTIES OF FILM

| | Glass transition point, °C. | Cohesive energy density $\delta^2$, cal./cc. | Tackiness | Spontaneous peeling-off | Peel strength, g./cm. | Strippability | Tensile strength, kg./cm.$^2$ | Elongation, percent | Weatherability | Waterproof ness | Transparency |
|---|---|---|---|---|---|---|---|---|---|---|---|
| F | | | | | | | | | | | |
| G | 20 | 118 | Absent | Absent | 8 | ◎ | 142 | 52 | ◎ | ◎ | ◎ |
| H | −5 | 100 | do | do | 6 | ◎ | 180 | 124 | ◎ | ◎ | ◎ |
| I | −55 | 94 | Present | do | <200 | X | >1 | <1,000 | ◎ | ◎ | ◎ |

TABLE 3(A)

| | Polymerization Conditions | | | | | Properties of Emulsion | | | | | |
|---|---|---|---|---|---|---|---|---|---|---|---|
| Ex. No. | Water soluble resin (a) [MW] [wt. percent] | Monomer (b) | Monomer (c) | Reaction medium | Reaction temperature, °C. | Resin content, wt. percent | Molecular weight | Viscosity, poise | Surface tension, dyne/cm. | Stability | Film forming property |
| 3 | PVP 700,000, 8.0 | BA 50 | MMA 50 | Ethylalcohol/water=50/50. | 60 | 50 | 120,000 | 20 | 22 | Absent | Present. |
| 4 | PVA (D.S. 89%; M.W. 30,000), 2.0 | BA 55 | VC 45 | Methylalcohol/water=40/60. | 70 | 50 | 170,000 | 13 | 50.5 | do | Do. |
| 5 | CMC 300,000, 30.0 | EA 55 | St 45 | Propylalcohol/water=46/54. | 70 | 50 | 170,000 | 14 | 30 | do | Do. |
| 6 | PVP 300,000, 5.0 | MA 82 | St 18 | Methylalcohol/water=50/50. | 70 | 50 | 220,000 | 17 | 32 | do | Do. |
| 7 | PVP 300,000, 5.0 | EA 75 | St 25 | do | 70 | 50 | 180,000 | 12 | 37 | do | Do. |
| 8 | PVP 300,000, 5.0 | PA 65 | St 35 | do | 70 | 50 | 170,000 | 15 | 27 | do | Do. |
| 9 | PVP 300,000, 5.0 | BA 55 | St 45 | do | 70 | 50 | 250,000 | 11 | 30 | do | Do. |
| 10 | PVA (D.S. 89%) 30,000, 5. | MA 84 | MMA 16 | Ethylalcohol/water=50/50. | 65 | 40 | 300,000 | 11 | 24 | do | Do. |
| 11 | PVA (D.S. 89%) 30,000, 5. | EA 72 | MMA 28 | do | 65 | 40 | 250,000 | 9 | 21 | do | Do. |
| 12 | PVA (D.S. 89%) 30,000, 5. | PA 68 | MMA 32 | do | 65 | 40 | 250,000 | 8 | 27 | do | Do. |
| 13 | PVA (D.S. 89%) 30,000, 5. | BA 50 | MMA 50 | do | 65 | 40 | 280,000 | 10 | 20 | do | Do. |
| 14 | CMC 300,000, 5 | MA 80 | VC 20 | do | 60 | 50 | 220,000 | 9 | 32 | do | Do. |
| 15 | CMC 300,000, 5 | EA 68 | VC 32 | do | 60 | 50 | 170,000 | 7 | 28 | do | Do. |

TABLE 3(A)—Continued

| | Polymerization Conditions | | | | | Properties of Emulsion | | | | | |
|---|---|---|---|---|---|---|---|---|---|---|---|
| Ex. No. | Water soluble resin (a) [MW] [wt. percent] | Monomer (b) | Monomer (c) | Reaction medium | Reaction temperature, °C. | Resin content, wt. percent | Molecular weight | Viscosity, poise | Surface tension, dyne/cm. | Stability | Film forming property |
| 16 | CMC 300,000, 5 | PA 60 | VC 40 | ___do___ | 60 | 50 | 170,000 | 7 | 23 | ___do___ | Do. |
| 17 | CMC 300,000, 5 | BA 55 | VC 45 | ___do___ | 60 | 50 | 180,000 | 6 | 23 | ___do___ | Do. |
| 18 | PVP 300,000, 5.0 | MA 90 | AN 10 | Methanol/water=50/50. | 70 | 50 | 280,000 | 23 | 31 | ___do___ | Do. |
| 19 | PVP 300,000, 5.0 | EA 80 | AN 20 | ___do___ | 70 | 50 | 260,000 | 21 | 30 | ___do___ | Do. |
| 20 | PVP 300,000, 5.0 | PA 70 | AN 30 | Butylalcohol/water=50/50. | 70 | 50 | 260,000 | 22 | 29 | ___do___ | Do. |
| 21 | PVP 300,000, 5.0 | BA 65 | AN 35 | n-Hexylalcohol/water=50/50. | 70 | 50 | 250,000 | 20 | 29 | ___do___ | Do. |

TABLE 3(B).—PROPERTY OF FILM

| Example No.: | Tg, °C. | $\delta^2$, cal./cc. | Tackiness | Spontaneous peeling-off | Peel strength g./cm. | Strippability | Tensile strength, kg./cm.$^2$ | Elongation, percent | Weatherability | Water profness | Transparency |
|---|---|---|---|---|---|---|---|---|---|---|---|
| 3 | 2 | 85 | Absent | Absent | 8 | ⊙ | 110 | 130 | ⊙ | ⊙ | ⊙ |
| 4 | −3 | 86 | ___do___ | ___do___ | 6 | ⊙ | 121 | 125 | ⊙ | ⊙ | ⊙ |
| 5 | 5 | 83 | ___do___ | ___do___ | 9 | ⊙ | 73 | 112 | ⊙ | ○ | ⊙ |
| 6 | 6 | 100 | ___do___ | ___do___ | 10 | ⊙ | 105 | 150 | ⊙ | ⊙ | ⊙ |
| 7 | 2 | 92 | ___do___ | ___do___ | 8 | ⊙ | 93 | 137 | ⊙ | ⊙ | ⊙ |
| 8 | 5 | 88 | ___do___ | ___do___ | 7 | ⊙ | 96 | 141 | ⊙ | ⊙ | ⊙ |
| 9 | 5 | 83 | ___do___ | ___do___ | 5 | ⊙ | 81 | 123 | ⊙ | ⊙ | ⊙ |
| 10 | 4 | 105 | ___do___ | ___do___ | 9 | ⊙ | 117 | 142 | ⊙ | ⊙ | ⊙ |
| 11 | 10 | 94 | ___do___ | ___do___ | 7 | ⊙ | 113 | 123 | ⊙ | ⊙ | ⊙ |
| 12 | 5 | 90 | ___do___ | ___do___ | 7 | ⊙ | 116 | 132 | ⊙ | ⊙ | ⊙ |
| 13 | 7 | 85 | ___do___ | ___do___ | 6 | ⊙ | 108 | 128 | ⊙ | ⊙ | ⊙ |
| 14 | 6 | 100 | ___do___ | ___do___ | 8 | ⊙ | 118 | 138 | ⊙ | ⊙ | ⊙ |
| 15 | 5 | 98 | ___do___ | ___do___ | 7 | ⊙ | 119 | 127 | ⊙ | ⊙ | ⊙ |
| 16 | 2 | 99 | ___do___ | ___do___ | 7 | ⊙ | 121 | 126 | ⊙ | ⊙ | ⊙ |
| 17 | −3 | 98 | ___do___ | ___do___ | 7 | ⊙ | 121 | 128 | ⊙ | ⊙ | ⊙ |
| 18 | 10 | 120 | ___do___ | ___do___ | 9 | ⊙ | 68 | 370 | ⊙ | ⊙ | ○ |
| 19 | 0 | 128 | ___do___ | ___do___ | 8 | ⊙ | 117 | 137 | ⊙ | ⊙ | ○ |
| 20 | −6 | 132 | ___do___ | ___do___ | 6 | ⊙ | 162 | 124 | ⊙ | ⊙ | ⊙ |
| 21 | −5 | 140 | ___do___ | ___do___ | 6 | ⊙ | 178 | 123 | ⊙ | ⊙ | ⊙ |

EXAMPLE 22 (FOR COMPARISON)

A copolymer obtained by polymerization of 65 parts by weight of butyl acrylate and 35 parts by weight of acrylonitrile in ethyl alcohol was mixed with an aqueous solution containing 4 parts by weight of polyvinyl alcohol having a degree of saponification (D.S.) of 99% and a molecular weight (M.W.) of 30,000 to give a dispersion having a resin concentration of 50% by weight and an alcohol concentration of 50% by volume. When this dispersion was left to stand, it was separated into two layers.

It was found that a film obtained from such resin dispersion was non-transparent and was partially dissolved in water.

EXAMPLE 23 (FOR COMPARISON)

The procedures of Example 22 were followed except that the copolymer was obtained by emulsion polymerization by using sodium oleate and sodium stearate. The obtained resin dispersion was separated into two layers.

It was found that a film obtained from such resin dispersion was non-transparent and was partially dissolved into water.

In the meantime, a resin emulsion was obtained by polymerizing the said monomers by using the said emulsifier and polyvinyl alcohol. When the resulting emulsion was left to stand for 7 days at 25° C., it was separated into two layers. It was found that a film obtained from this resin dispersion was non-transparent and was partially dissolved into water.

EXAMPLES 24 TO 30

The same polymerization as in Example 1 was carried out with the use of various water-soluble resins (a), alkyl acrylate monomers (b) and copolymerizable monomers (c). Results are shown in Table 4 in which the following abbreviations are used. PVME: polyvinyl methyl ether; MC: methyl cellulose; PAA: polyacrylamide; HEC: hydroxy ethyl cellulose; D: dextrin; PEO: polyethylene oxide; VDC: vinylidene chloride; α-mSt: α-methyl styrene; VAC: vinyl acetate; VP: vinyl propionate; and MAN: methacrylonitrile.

TABLE 4(A)

| | Polymerization Conditions | | | | | Properties of Emulsion | | | | | |
|---|---|---|---|---|---|---|---|---|---|---|---|
| Ex. No. | Water soluble resin (a) [MW] [wt. percent] | Monomer (b) | Monomer (c) | Reaction medium | Reaction temperature, °C. | Resin content, wt. percent | Molecular weight | Viscosity, poise | Surface tension, dyne/cm. | Stability | Film forming property |
| 24 | HEC 100,000, 4 | BA 80 | VDC 20 | Methylalcohol/water=50/50. | 70 | 50 | 200,000 | 100 | 40 | Negligible | Present. |
| 25 | PVME 300,000, 4 | EA 80 | VAC 20 | ___do___ | 65 | 50 | 220,000 | 13 | 30 | ___do___ | Do. |
| 26 | MC 200,000, 4 | BA 50 | α-mSt 50 | ___do___ | 60 | 50 | 170,000 | 12 | 31 | ___do___ | Do. |
| 27 | PAA 300,000, 4 | MA 88 | VP 12 | ___do___ | 60 | 50 | 230,000 | 16 | 37 | ___do___ | Do. |
| 28 | D 100,000, 4 | EA 70 | MAN 30 | ___do___ | 60 | 50 | 150,000 | 18 | 34 | ___do___ | Do. |
| 29 | PEO 50,000, 4 | BA 50 | MMA 50 | ___do___ | 60 | 50 | 250,000 | 11 | 27 | ___do___ | Do. |
| 30 | PVA (D.S. 89%) 30,000, 5. | BA 90 | VDC 10 | ___do___ | 70 | 50 | 230,000 | 13 | 31 | Absent | Do. |

TABLE 4(B).—PROPERTIES OF FILM

| Example No.: | Tg, °C. | δ², cal./cc. | Tackiness | Spontaneous peeling-off | Peel strength g./cm. | Strippability | Tensile strength, kg./cm.² | Elongation, percent | Weatherability | Proofness | Water Transparency |
|---|---|---|---|---|---|---|---|---|---|---|---|
| 24 | −5 | 110 | Absent | Absent | 38 | ○ | 70 | 190 | ◎ | ◎ | ◎ |
| 25 | 2 | 92 | do | do | 44 | ○ | 85 | 200 | ◎ | ○ | ◎ |
| 26 | 8 | 92 | do | do | 12 | ○ | 96 | 154 | ◎ | ◎ | ◎ |
| 27 | −7 | 90 | do | do | 23 | ○ | 78 | 160 | ◎ | ◎ | ◎ |
| 28 | 5 | 138 | do | do | 10 | ◎ | 98 | 130 | ◎ | ◎ | ◎ |
| 29 | 2 | 85 | do | do | 12 | ○ | 92 | 130 | ◎ | ◎ | ◎ |
| 30 | −7 | 110 | do | do | 43 | ○ | 70 | 240 | ◎ | ◎ | ◎ |

EXAMPLE 31 (FOR COMPARISON)

Each of commercially available acrylic emulsion paints and the emulsion obtained in Example 1–B was applied to an aminoalkyl resin-painted plate and a stainless steel plate by means of a brush at room temperature to form a film. The properties of the film as a strippable film are shown in Table 5 below.

TABLE 5

| Type of paints | Manufacturer | Film-forming property at room temp. | Film tenacity, g./cm.² | Tackiness of film | Strippability Aminoalkyd resin-painted surface | Strippability Stainless steel plate | Contact drying time |
|---|---|---|---|---|---|---|---|
| Example 1–B | | Present | 110 | Absent | ◎ | ◎ | 30 minutes. |
| Primal 0–15 | Rohm & Haas | do | 70 | Present | X | X | <5 hours. |
| Primal AC–33 | do | do | 60 | do | X | X | Do. |
| Butakon ML–501 | ICI | do | 120 | Absent | X | X | Do. |
| Hycar 2600 x 39 | Goodrich Chem | do | 70 | Present | X | X | Do. |

EXAMPLE 32 (FOR COMPARISON)

Each of a commercially available vinyl solvent type, hot melt type and emulsion type strippable paint was applied by means of a brush onto an aminoalkyd resin paint-coated surface and a stainless steel plate. The strippability and water-proofness of the formed film are shown in Table 6 below. Every one of them had difficulty in respect of strippability of the applied surface.

TABLE 6

| Paints | Strippability of film Aminoalkyd resin-coated surface | Strippability of film Stainless steel plate | Water-proofness |
|---|---|---|---|
| Vinyl solvent type (vinyl chloride-vinyl acetate copolymer, polyacrylic acid in acetone solution) | X | ◎ | ◎ |
| Hot melt type (polyethylene, wax, natural resin) | X | ◎ | ◎ |
| Emulsion type (polybutadiene latex) | X | ◎ | X |

What is claimed is:

1. A strippable paint composition comprising an emulsion obtained by copolymerizing (b) an ester monomer comprising a $C_1$–$C_8$ alkyl ester of acrylic acid and (c) a monomer of the vinyl series, copolymerizable with the monomer (b) and selected from the group consisting of vinyl chloride, styrene, methyl methacrylate, acrylonitrile, vinylidene chloride, α-methyl styrene, vinyl acetate; vinyl ester propionate and methacrylonitrile, the monomer (b) being present in an amount of 40–90% by weight based on the total weight of the monomers (b) and (c), in the presence of (a), a water soluble resin trunk polymer having a molecular weight of at least 10,000 selected from the group consisting of polyvinyl methyl ether, methyl cellulose, polyacrylamide, hydroxyethyl cellulose, polyethylene oxide, polyvinyl alcohol, partially saponified derivative of polyvinyl alcohol, polyvinyl pyrrolidone and carboxy methyl cellulose, in an amount of 0.5–50% by weight based on the total weight of monomers (b) and (c), in a medium of a saturated aliphatic lower alcohol having 1–4 carbon atoms and containing up to 60% by weight of water, said emulsion composition being such that a film formed of the same on a solid surface has a cohesion energy density of not less than 80 cal./cm.³, a glass transition point of from minus 40° C. to plus 30° C., and an ability to be stripped as a continuous film from such solid surface.

2. A composition described in claim 1 wherein said water-soluble resin trunk polymer is a polymer selected from the group consisting of polyvinyl methyl ether, methyl cellulose, polyacrylamide, hydroxyethyl cellulose and polyethylene oxide and said monomer of (c) is a monomer selected from the group consisting of vinylidene chloride, α-methyl styrene, vinyl acetate, vinyl ester propionate and methacrylonitrile.

3. A composition described in claim 1 wherein said water-soluble resin trunk polymer of (a) is a polymer having a molecular weight of at least 10,000 selected from the group consisting of polyvinyl alcohol, a partially saponified derivative thereof, polyvinyl pyrrolidone and carboxy methyl cellulose, said alkyl ester of (b) is an aliphatic lower alkyl ester having 1–4 carbon atoms, and said monomer of (c) is a monomer selected from the group consisting of vinyl chloride, styrene, methylmethacrylate and acrylonitrile.

4. A composition described in claim 1 wherein a resin component derived from said (a), (b) and (c) is 20–60% by weight in said emulsion by dry weight.

5. A composition described in claim 1 wherein a surface tension of said emulsion is below 45 dyne/cm. and a viscosity thereof is 0.1–50 poise.

6. A composition described in claim 5 wherein a film formed by said emulsion has a tensile strength of above 50 kg./cm.² and a peel strength of below 50 g./cm.

7. The composition of claim 1 wherein said water soluble resin trunk polymer is present in an amount of 1–10% by weight based on the total weight of the monomers (b) and (c).

References Cited

UNITED STATES PATENTS 2,773,050   12/1956   Caldwell et al. _____ 260—901

WILLIAM H. SHORT, Primary Examiner

L. M. PHYNES, Assistant Examiner

U.S. Cl. X.R.

260—881, 884, 885, 886, 875

UNITED STATES PATENT OFFICE
CERTIFICATE OF CORRECTION

Patent No. 3,491,039                              January 20, 1970

Masao Takahashi et al.

It is certified that error appears in the above identified patent and that said Letters Patent are hereby corrected as shown below:

Column 4, line 28, "85-89%" should read -- 85-99% --. Column line 8, "is" should read -- in --.

Signed and sealed this 10th day of November 1970.

(SEAL)
Attest:

Edward M. Fletcher, Jr.                      WILLIAM E. SCHUYLER, JR.
Attesting Officer                                Commissioner of Patents